(12) United States Patent
Kruse et al.

(10) Patent No.: US 9,346,533 B2
(45) Date of Patent: May 24, 2016

(54) ATTACHMENT OF AIRCRAFT RIBS TO SPARS HAVING VARIABLE GEOMETRY

(75) Inventors: John Scott Kruse, Florissant, MO (US); John Hershey Fogarty, St. Louis, MO (US)

(73) Assignee: THE BOEING COMPANY, Chicago, IL (US)

( * ) Notice: Subject to any disclaimer, the term of this patent is extended or adjusted under 35 U.S.C. 154(b) by 603 days.

(21) Appl. No.: 13/419,791

(22) Filed: Mar. 14, 2012

(65) Prior Publication Data

US 2013/0240671 A1 Sep. 19, 2013

(51) Int. Cl.
*B64C 3/18* (2006.01)
*B64C 3/34* (2006.01)

(52) U.S. Cl.
CPC ............. *B64C 3/185* (2013.01); *B64C 3/187* (2013.01); *B64C 3/34* (2013.01); *B64D 2211/00* (2013.01); *Y10T 29/49826* (2015.01); *Y10T 403/32861* (2015.01)

(58) Field of Classification Search
CPC .......... B64C 3/185; B64C 3/187; B64C 3/34; B64D 2211/00; Y10T 403/32861; Y10T 29/49826
USPC ................ 244/117 R, 120, 219, 123.1, 123.9
See application file for complete search history.

(56) References Cited

U.S. PATENT DOCUMENTS

| | | | |
|---|---|---|---|
| 1,343,707 A | 6/1920 | Carns | |
| 1,548,403 A | 8/1925 | Wylie | |
| 1,760,386 A | 5/1930 | Vliet | |
| 1,765,791 A * | 6/1930 | Fokker | 244/132 |
| 2,400,649 A * | 5/1946 | Larsen | 416/226 |
| 2,749,061 A | 6/1956 | Franz | |
| 2,981,337 A * | 4/1961 | Stuart, III | 416/226 |
| 3,013,614 A * | 12/1961 | Platt | 416/225 |
| 3,756,541 A * | 9/1973 | Orazi | 244/39 |
| 4,577,815 A | 3/1986 | Orazi | |
| 4,739,954 A | 4/1988 | Hamilton | |
| 5,984,230 A | 11/1999 | Orazi | |
| 6,644,599 B2 | 11/2003 | Perez | |
| 7,762,500 B1 | 7/2010 | Dhall | |
| 8,128,025 B2 | 3/2012 | Rawdon et al. | |
| 2002/0100842 A1* | 8/2002 | Perez | 244/219 |
| 2005/0116086 A1 | 6/2005 | Orazi | |
| 2006/0145030 A1 | 7/2006 | Cowan et al. | |
| 2008/0001028 A1 | 1/2008 | Kendall et al. | |
| 2009/0236473 A1 | 9/2009 | Rawdon et al. | |
| 2010/0213309 A1 | 8/2010 | Parks | |
| 2011/0017876 A1 | 1/2011 | Manley et al. | |
| 2011/0101172 A1 | 5/2011 | Dyckrup | |
| 2013/0099063 A1* | 4/2013 | Grip et al. | 244/219 |
| 2013/0240671 A1* | 9/2013 | Kruse et al. | 244/123.9 |

OTHER PUBLICATIONS

"Solar Flight News," SolarFlight, 3 pages, accessed May 6, 2011, http://solar-flight.com/news/index.html.

"List of human-powered aircraft," Wikipedia, 9 pages, accessed Oct. 19, 2011, http:\\en.wikipedia.org/wiki/list_of_human-powered_aircraft.

(Continued)

*Primary Examiner* — Valentina Xavier (74) *Attorney, Agent, or Firm* — Yee & Associates, P.C.

(57) ABSTRACT

An aircraft wing includes a rib attached by a joint to a tubular spar that varies in cross sectional shape during flight. The joint includes a ring attached to the tubular spar, and pivot pins connecting the ring with the rib. The pivot pins allow relative movement between the rib and the tubular spar as the tubular spar varies in cross sectional shape.

19 Claims, 10 Drawing Sheets

(56) References Cited

OTHER PUBLICATIONS

"Gossamer Penguin," Wikipedia, 1 page, accessed Oct. 19, 2011, http://en.wikipedia.org/wiki/Gossamer_Penguin.
"AeroVironment," Wikipedia, 4 pages, accessed Oct. 19, 2011, http://en.wikipedia.org/wiki/AeroVironment.
"UAS Advanced Development: Solar Challenger," AeroVironment, Inc., UAS Advanced Development Center, 2 pages, accessed Oct. 19, 2011, http://www.avinc.com/uas/adc/solar_challenger/.
Related U.S. Appl. No. 13/276,750, filed Oct. 19, 2011, 76 Pages.
Extended European Search Report, dated Jul. 14, 2014, regarding Application No. EP13154386.0, 7 pages.
Office Action, Feb. 9, 2015, regarding U.S. Appl. No. 13/276,750, 23 pages.
Extended European Search Report, dated Mar. 19, 2015, regarding Application No. EP12188937.2, 7 pages.
Notice of Allowance, Jun. 2, 2015, regarding U.S. Appl. No. 13/276,750, 8 pages.

\* cited by examiner

ATTACHMENT OF AIRCRAFT RIBS TO SPARS HAVING VARIABLE GEOMETRY

STATEMENT REGARDING FEDERALLY SPONSORED RESEARCH OR DEVELOPMENT

This invention was made with U.S. Government support under Agreement No. HR0011-10-9-0010, awarded by the Defense Advanced Research Projects Agency (DARPA). The U.S. Government has certain rights in the invention.

CROSS REFERENCE TO RELATED APPLICATIONS

This application is related to U.S. patent application Ser. No. 13/276,750 filed Oct. 19, 2011, the entire disclosure of which is incorporated by reference herein.

BACKGROUND INFORMATION

1. Field

This disclosure generally relates to construction of airfoils such as aircraft wings, and deals more particularly with attachment of wing ribs to tubular wing spars having variable cross sectional geometries.

2. Background

High altitude, long endurance (HALE) solar powered aircraft have been designed that will remain aloft continuously for extended periods. During the day, on-board solar arrays generate electricity that is used to power electric propulsion motors, and an electrolyzer that generates hydrogen and oxygen which is stored in on-board tanks. At night, the electric propulsion motors may be powered by a fuel cell that uses a combination of the hydrogen and oxygen stored in the tanks to generate electricity. Thus, the tanks are cyclically pressurized as the hydrogen and oxygen in the storage tanks are repeatedly drawn down and then replenished.

In order to reduce weight and achieve performance requirements, the aircraft may be fabricated from lightweight structures that are integrated with the aircraft's energy storage system. For example, tubular wing spars may function as storage tanks to hold the gaseous hydrogen and oxygen used by the fuel cell to produce electricity. Optimum spar weight may be achieved using an unsymmetric laminate construction which, because of interlaminar stresses, warps the spar into an ovoidal cross sectional shape. As pressurized gas is introduced into the spar, the spar gradually deforms and its cross sectional shape changes from an ovoid to nearly circular. As gas is drawn from the spar, its cross sectional shape springs-back to an ovoid. Spar deformation caused by this cyclical gas pressurization may result in the transmission of stresses to wing ribs to which the spar may be fixedly attached. These transmitted stresses may alter the shape of the rib and thus the overall shape of the airfoil, thereby affecting the aerodynamic performance of the wing.

Accordingly, there is a need for a joint for attaching wing ribs to a tubular spar that substantially isolates the ribs from stresses caused by changes in the cross sectional shape of the spar due to cyclical pressurization.

SUMMARY

The disclosed embodiments provide a method and a joint for attaching aircraft wing ribs or similar components to a tubular spar that varies in cross sectional shape during flight due to its composite laminate construction configuration and/or to changes in its internal pressurization. The method and attachment joint employ pivotal connections strategically located about the circumference of the tubular spar which allow relative motion between the tubular spar and the ribs, thereby isolating the ribs from stresses caused by cross sectional deformation of the spar. The pivotal connections include pivot pins located at the points of inflection of the changing cross sectional shape of the spar. Locating the pivot pins at the inflection points may substantially eliminate induced radial deflection of the tubular spar into the rib. The pivotal connections may also reduce or prevent a moment or twisting action of the tubular spar from being induced into the rib.

According to one disclosed embodiment, a joint is provided for attaching an aircraft wing rib to a tubular wing spar that varies in cross sectional shape during flight. The joint comprises a ring substantially surrounding and attached to the tubular spar, and pivot pins pivotally connecting the ring with the rib. The pivot pins allow relative movement between the rib and the tubular spar as the tubular spar varies in cross sectional shape. The ring is compliant and radially loaded against the tubular spar. The ring has a radial stiffness less than a radial stiffness of the tubular spar. The rib includes forward and rear portions. The pivot pins include a first pair of pivot pins pivotally connecting the ring with the forward portion of the rib, and a second pair of pivot pins connecting the ring with the rear portion of the rib. The ring may comprise first and second halves that are joined together by splice joints. The ring extends around and engages substantially the entire circumference of the tubular spar. The tubular spar varies in cross sectional shape about points of inflection, and each of the pivot pins is located substantially at one of the points of inflection. The ring may be formed of a fiber reinforced polymer laminate.

According to another disclosed embodiment, a joint is provided between a non-deformable structure and a tubular member having a cross sectional shape that deforms about points of inflection along a curve of the tubular member. The joint comprises a ring extending substantially around the circumference of and attached to the tubular member, and pivot pins connecting the ring with the non-deformable structure respectively at the points of inflection. The ring is compliant and is radially loaded against a tubular substantially around the entire circumference of the tubular member, and the ring is configured to remain compliant to the tubular member as the cross sectional shape of the tubular member deforms. The ring may include a first portion having a substantially U-shaped cross section, and a second portion that includes a substantially flat strap. The joint may further comprise webs on the non-deformable structure, wherein the pivot pins are respectively attached to the webs.

According to another disclosed embodiment, a method is provided of attaching an aircraft wing rib to a tubular wing spar having a cross sectional shape that may deform during flight. The method comprises placing a ring around the tubular spar, loading the ring against the tubular spar, and pivotally connecting the ring to the rib. Loading of the ring against the tubular spar may include tensioning the ring. Pivotally connecting the ring to the rib includes locating pivotal connections between the rib and the tubular spar at points of inflection along a curvature of the tubular spar. Placing the ring around the tubular spar may include placing two ring halves around the tubular spar, and splicing the ring halves together. The method may further include placing webs on the rib, wherein pivotally connecting the ring to the rib is performed by pivotally connecting the ring to each of the webs.

According to still another embodiment, a method is provided of transferring loads between a non-deformable structure and a tubular member having a cross sectional shape that deforms under load. The method comprises pivoting the tubular member relative to the non-deformable structure as the cross sectional shape of the tubular member deforms. Pivoting the tubular member relative to the non-deformable structure is performed by pivoting the tubular member about points of inflection where a curvature of the tubular member changes due to the deformation of the tubular member. The method may further comprise transferring loads between the tubular member and the non-deformable structure through a ring surrounding and attached to the tubular member.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
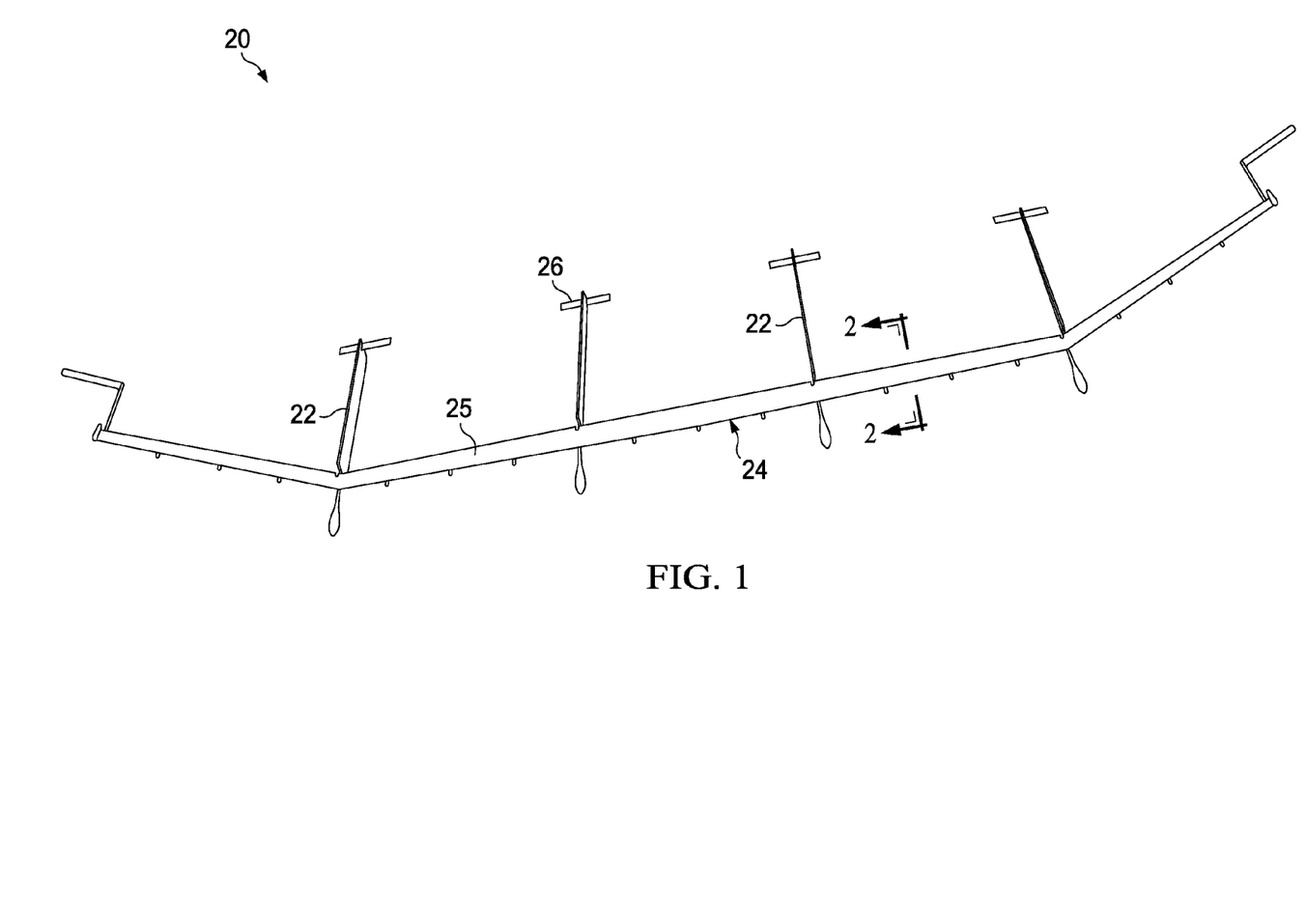
FIG. 1 is an illustration of an isometric view of an aircraft having a wing employing a tubular spar attached to wing ribs using the disclosed joint.

Referring first to FIG. 1, a high altitude, long endurance aircraft (HALE) 20, comprises a primary airfoil 24 in the form a main wing 25 attached to multiple spaced apart fuselages 22 each having a horizontal stabilizer 26. Although not shown in FIG. 1, the aircraft 20 may include solar panels for generating electricity to drive electric propulsion motors during daytime flight, and one or more fuel cells which drive the propulsion motors at night using gaseous fuels such as hydrogen and oxygen that are stored within the wing 25. The HALE aircraft 20 is merely illustrative of a wide range of aircraft that may employ features of the disclosed embodiments.

Figure 2:
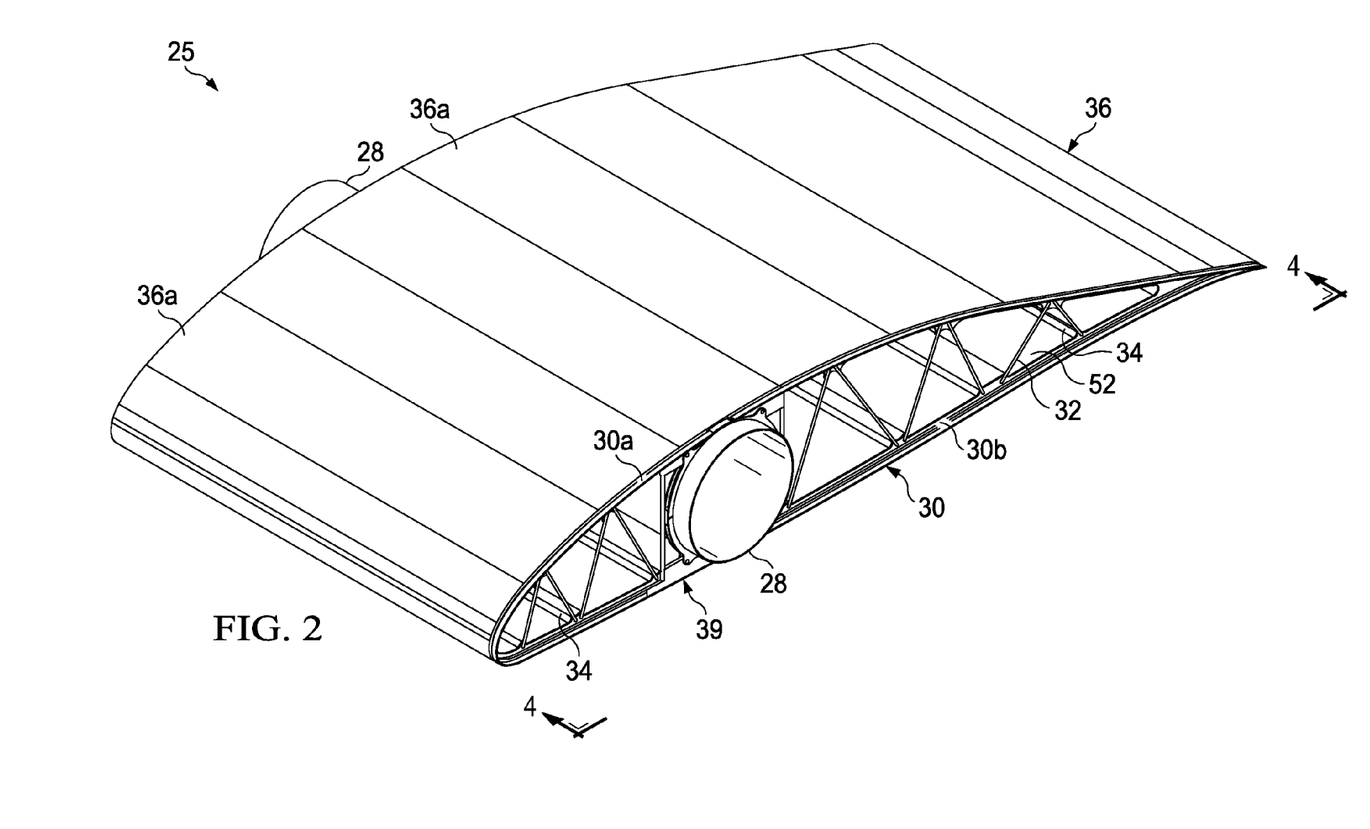
FIG. 2 is an illustration of a sectional view taken along the line 2-2 in FIG. 1.

Referring to FIG. 2, the wing 25 may comprise a deformable tubular member such as a tubular wing spar 28 attached by joints 39 to each of a plurality of substantially non-deformable structures, such as spaced apart ribs 30. Each of the ribs 30 may be stiffened by struts 32 arranged in a truss pattern between upper and lower chords 30a, 30b respectively, of the rib 30, and the wing 25 may be stiffened in its span-wise direction by plurality of stringers 34. The wing 25 further includes an upper wing skin 36 which may comprise a plurality of lightweight panels 36a covering the stringers 34 and the ribs 30. In one embodiment, the wing skin panels 36a may comprise a lightweight foam, and the ribs 30, struts 32, and stringers 34 may each comprise a fiber reinforced polymer such as a carbon fiber epoxy laminate. The wing 25 may include a lower wing skin 52 comprising, for example and without limitation, a thin flexible film membrane. Other types of wing skins are possible. The tubular spar 28 may be fabricated from a fiber reinforced polymer laminate using an unsymmetric laminate construction. This unsymmetrical laminate construction may result in interlaminar stresses that warp the tubular spar 28 into an ovoidal cross sectional shape when unpressurized or at low pressures, as will be discussed later in more detail. Additional details of a typical construction for the wing 25 are disclosed in U.S. patent application Ser. No. 13/276,750 filed Oct. 19, 2011.

Figure 3:
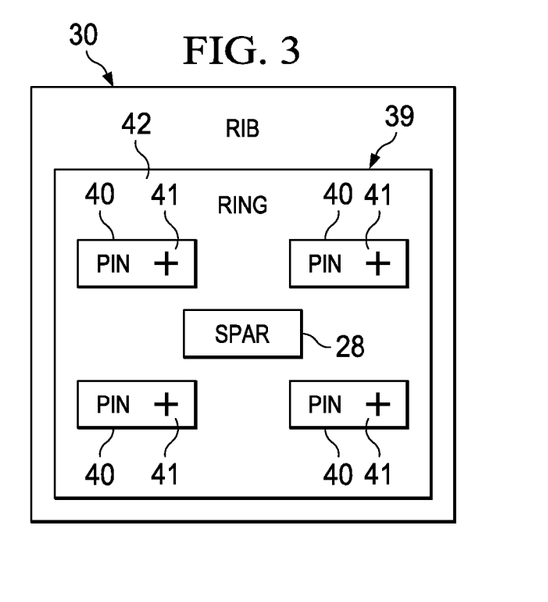
FIG. 3 is an illustration of a functional block diagram of a joint for attaching a wing rib to a tubular spar having a variable geometry.
Figure 4:
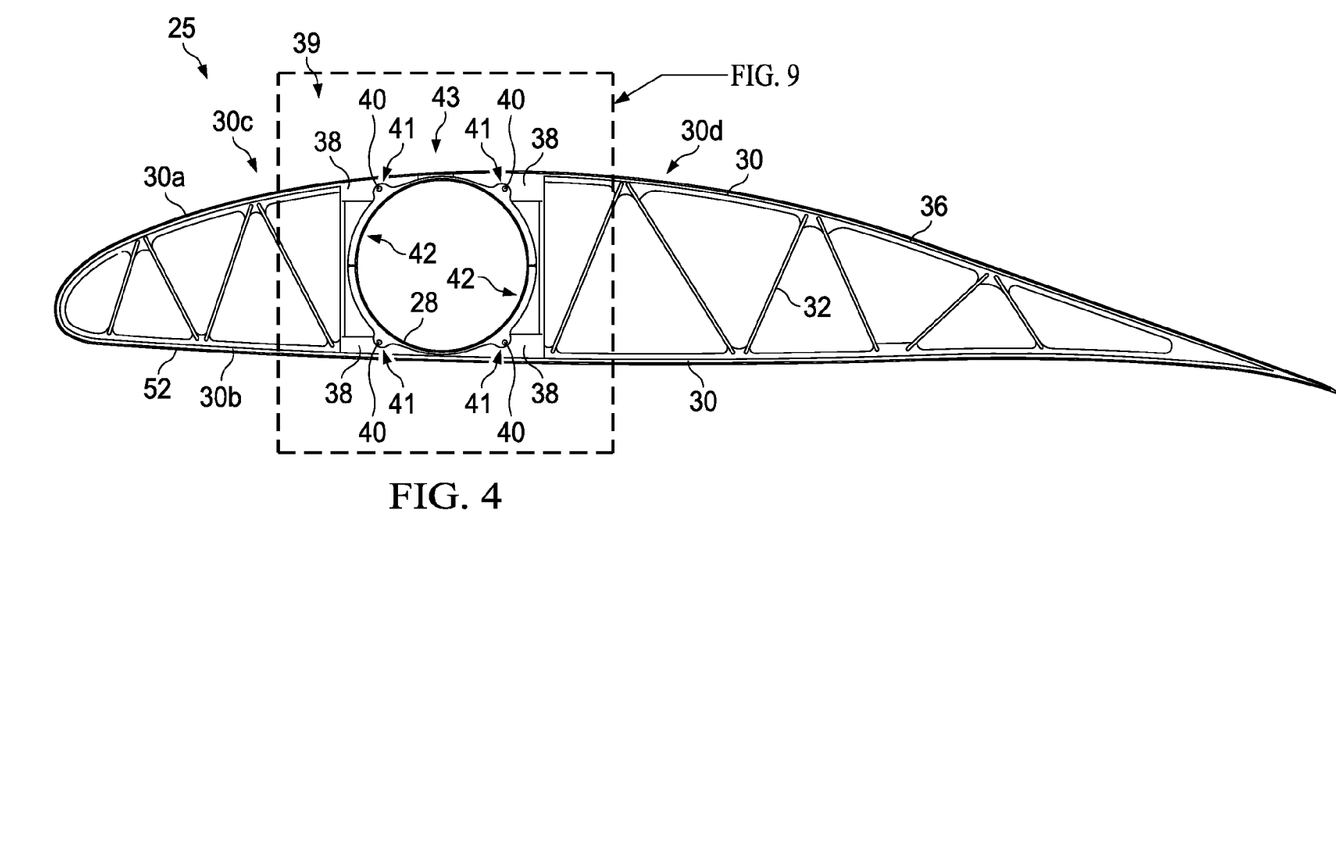
FIG. 4 is an illustration of an end view taken in the direction "4" in FIG. 2.

Referring now to FIG. 3, each of the joints 39 broadly comprises a ring 42 surrounding the tubular spar 28, and a plurality of pivot pins 40 strategically located around the circumference of the tubular spar 28. The ring 42 is compliant to the tubular spar 28. The pivot pins 40 pivotally connect the ring 42 to the rib 30, respectively at points of inflection 41. The points of inflection 41 are the points or locations along the curvature of the tubular spar 28 where the curvature of the tubular spar 28 changes during its deformation due to internal pressure changes. Locating the pivot pins 40 at the inflection points 41 may substantially eliminate induced radial deflection into the rib 30. Each of the pivot pins 40 may comprise, without limitation, a bolt and nut (not shown) assembled to allow free rotational movement of the ring 42 relative to the rib 30. The pivot pins 40 along with the compliancy of the ring 42 allow the ring 42 to deform without transmitting substantial stress from the tubular spar 28 to the rib 30.

Figures 5, 6:
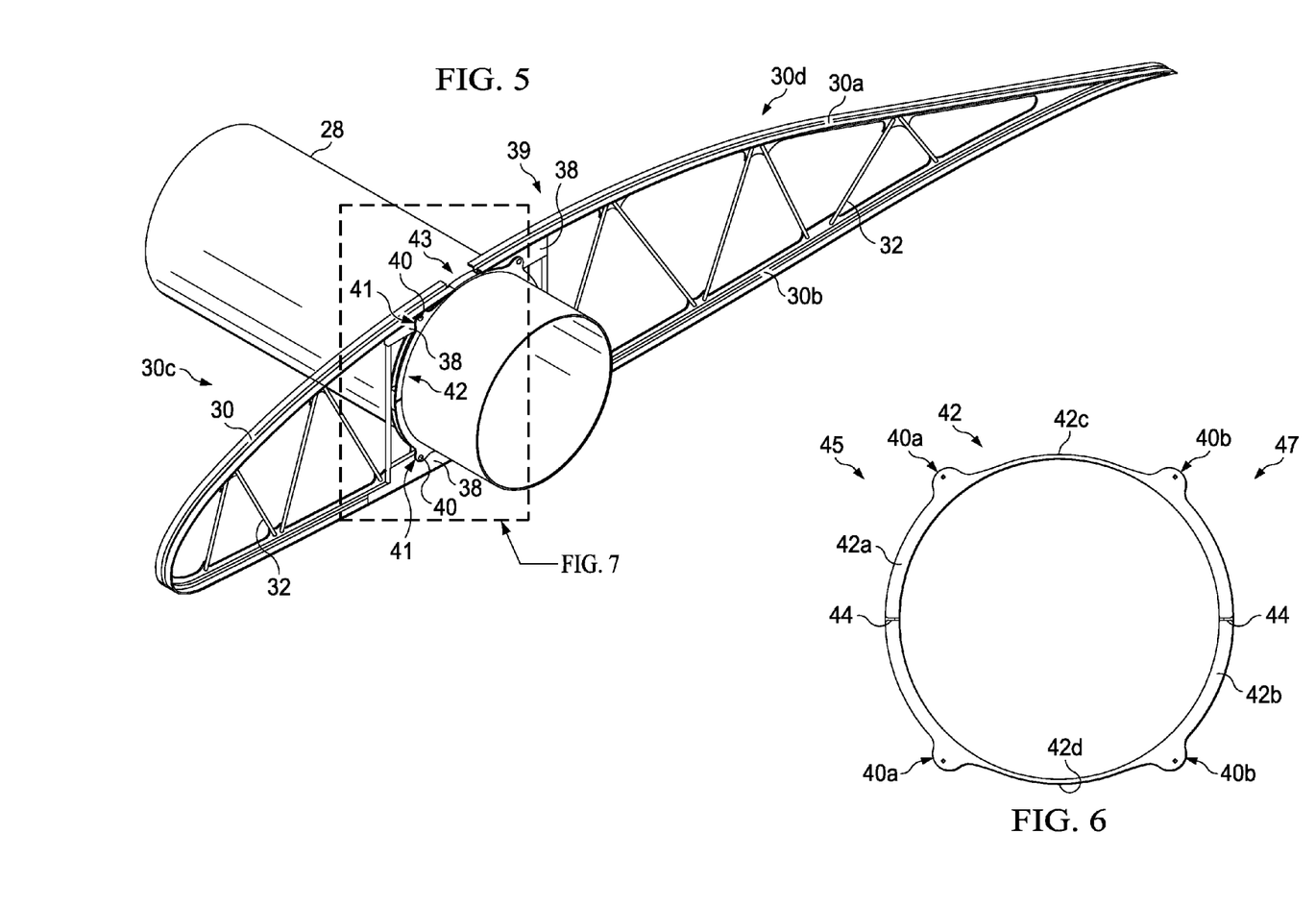
FIG. 5 is an illustration of a perspective view showing the attachment of a tubular spar to a rib, the wing skin having been removed for clarity.
FIG. 6 is an illustration of a side view of the ring forming part of the joint shown in FIGS. 3-5.

Referring now to FIGS. 4-7, the pivot pins 40 connect the ring 42 to webs 38 forming part of the rib 30. In one embodiment, the upper chord 30a (FIGS. 4, 5 and 7) of the rib 30 includes a rib opening 43 therein for purposes which will become later apparent. Referring particularly to FIG. 6, the ring 42 conformally engages and extends around the circumference of the spar 28, and functions to attach and support rib 30 on the tubular spar 28, as well as stabilize the tubular spar 28. As will be discussed below in more detail, the ring 42 may be fabricated of a lightweight material such as a fiber reinforced polymer laminate that has a radial stiffness that is less than the radial stiffness of the rib 30. The ring 42 comprises first and second halves 42a, 42b that are joined together by splices 44. Upper and lower sections 42c, 42d respectively of the ring 42 may have a reduced thickness, as will be discussed below, or other characteristics or properties that allow these sections to more readily flex and deform along with the deformation of the tubular spar 28. The forward section (FIG. 5) of the ring 42 is pivotally attached to a forward portion 30c of the rib 30 by a first pair 40a of the pivot pins 40 (FIG. 6). A rear section 47 of the ring 42 is pivotally attached to a rear portion 30d of the rib 30 by a second pair 40b of the pivot pins 40. It should be noted here that while a two-piece ring construction has been disclosed in the illustrated example, in other embodiments, the ring 42 may comprise more than two pieces or may be of a one-piece construction.

Figure 7:
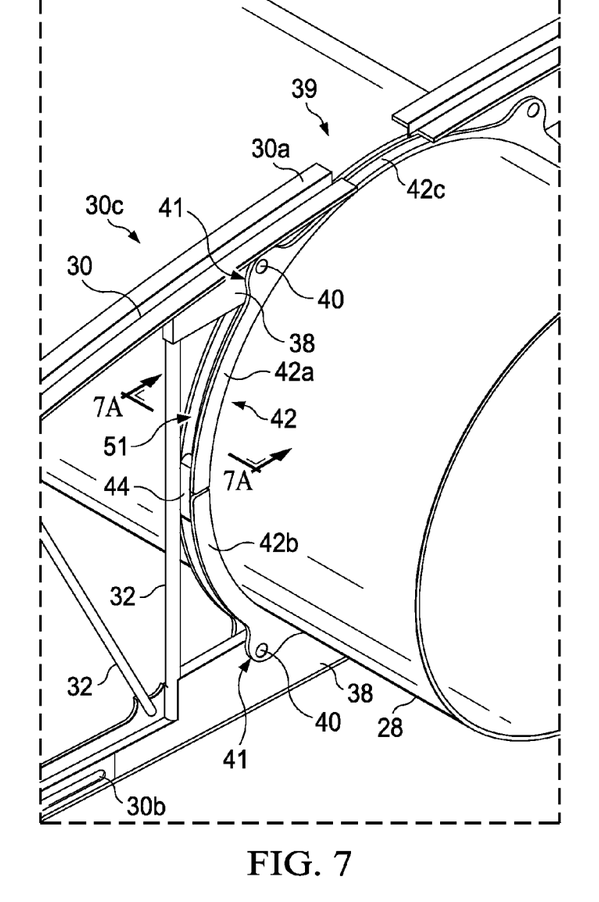
FIG. 7 is an illustration of a perspective view of the area designated as FIG. 7 in FIG. 5.
Figure 7A:
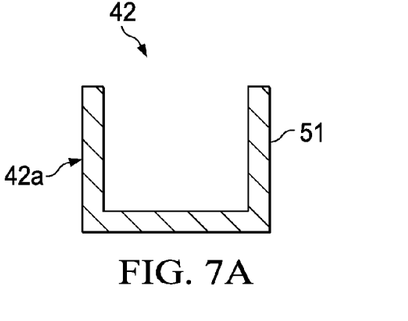
FIG. 7A is an illustration of a sectional view taken along the line 7A-7A in FIG. 7.
Figure 8:
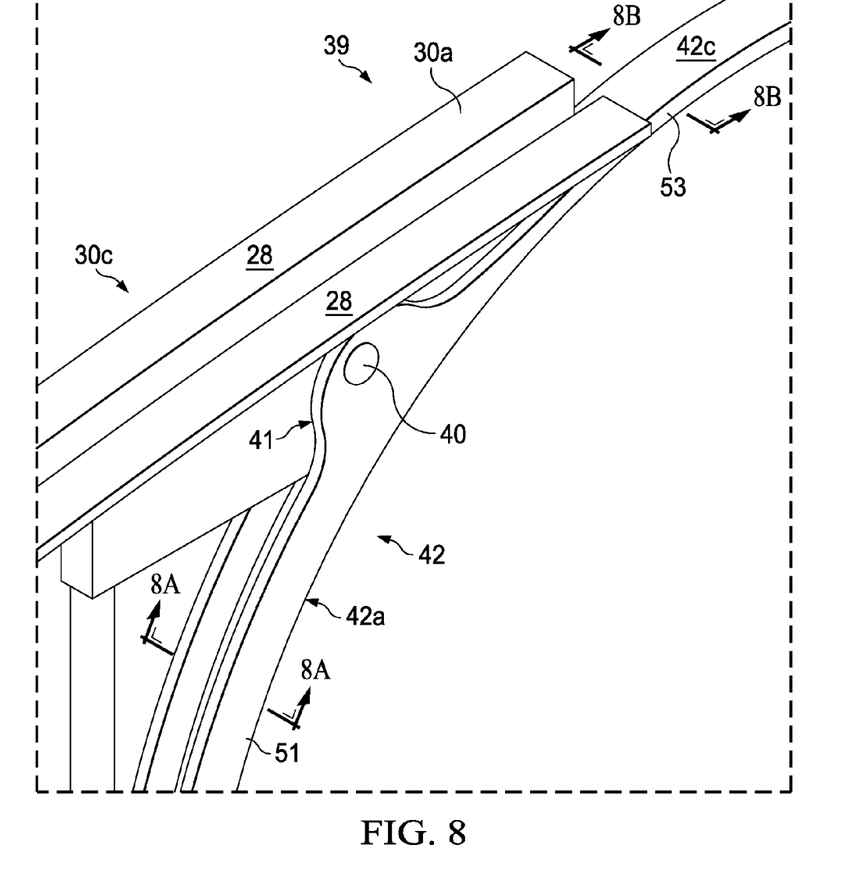
FIG. 8 is an illustration similar to FIG. 7 but showing an alternate embodiment of the ring.
Figure 8A:
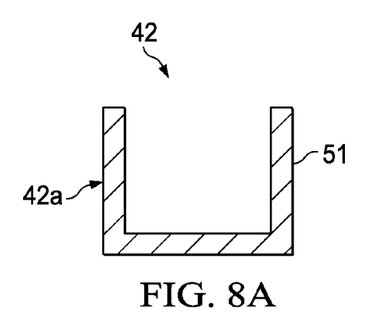
FIG. 8A is an illustration of a sectional view taken along the line 8A-8A in FIG. 8.
Figure 8B:
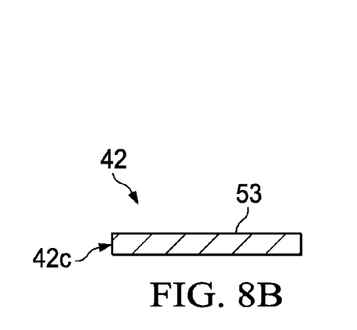
FIG. 8B is an illustration of a sectional view taken along the line 8B-8B in FIG. 8.

Referring particularly to FIGS. 7 and 7A, in one embodiment, the ring 42 may have a substantially U-shaped cross section 51 around its entire circumference. In an alternate embodiment shown in FIGS. 6, 8, 8A, 8B, 9 and 10, the forward and aft sections 45, 47 (FIG. 6) of the ring 42 have a substantially U-shaped cross section 51 (see FIG. 8A), and the upper and lower sections 42c, 42d have a strap-like construction possessing a substantially flat cross sectional shape 53 (see FIG. 8B).

Figure 9:
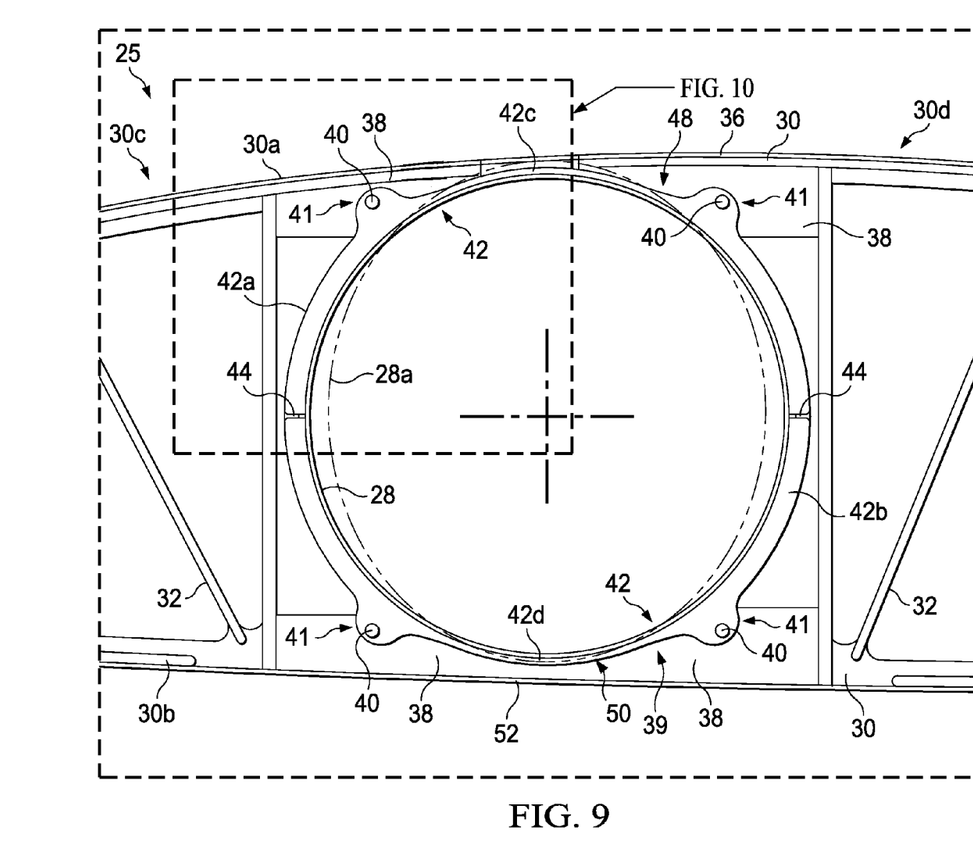
FIG. 9 is an illustration of the area designated as FIG. 9 in FIG. 4.

Referring now to FIG. 9, the ring 42 is loaded radially inwardly against the tubular spar 28 around its entire circumference by tensioning the ring 42. Tensioning of the ring 42 may be achieved as it is being installed around the tubular spar 28, so that the ring 42 is preloaded against the tubular spar 28 following its installation. Alternatively, the ring 42 may be provided with a conventional tensioning device (not shown) which may be used after the ring 42 is installed to tension the ring 42 and compress it against the tubular spar 28. Other installation and tensioning methods are possible.

The cross sectional shape of the tubular spar 28 may be substantially ovoid at the time it is manufactured, as well as throughout periods of relatively low internal pressure. The tubular spar 28 deforms to a substantially circular cross sectional shape when it is at or near full internal gas pressurization, however as gas is drawn from the tubular spar 28 for use in propelling the aircraft 20, the tubular spar 28 progressively deforms and springs back to its natural ovoidal cross sectional shape. In FIG. 9, the cross sectional shape of the tubular spar 28 when substantially fully pressurized is shown in full line at 28, and its ovoidal cross sectional shape when substantially unpressurized is shown by the broken line 28a. As the tubular spar 28a deforms, the ring 42 flexes and substantially follows the deformation of the tubular spar 28, remaining conformed to and loaded against the tubular spar 28. The upper and lower sections 42c, 42d of the ring 42 deform substantially vertically along with the tubular spar 28 into upper and lower vertical gaps 48, 50, respectively, in the rib 30.

Figure 10:
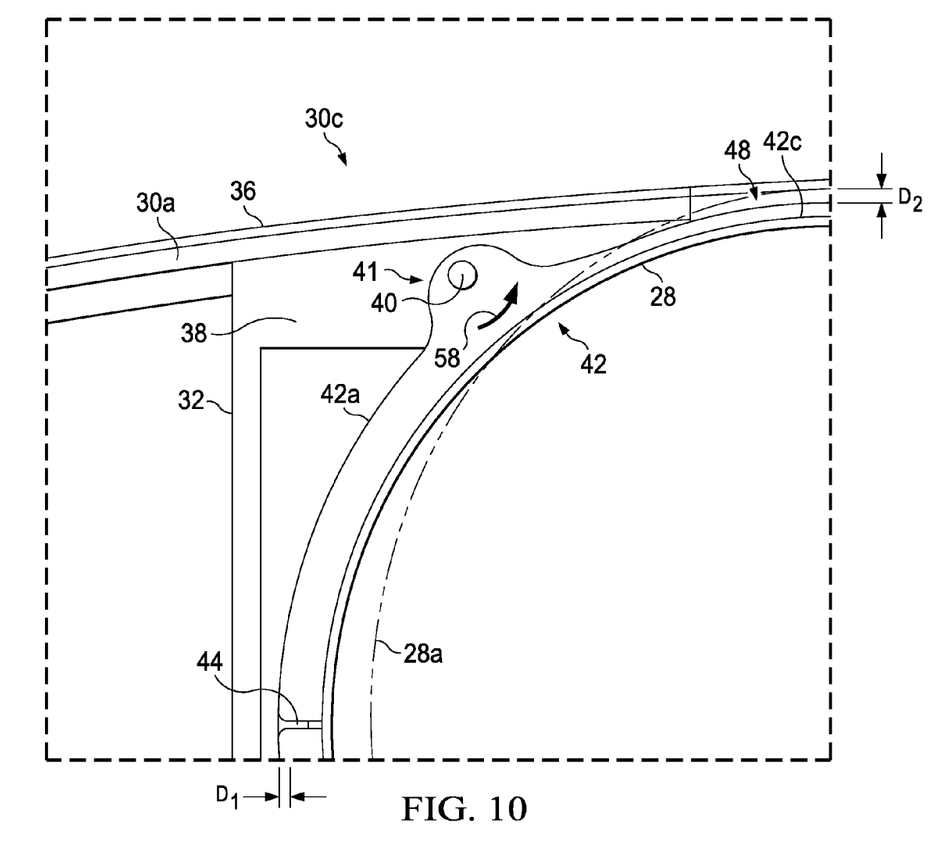
FIG. 10 is an illustration of the area designated as FIG. 10 in FIG. 9, better illustrating the displacement and change in shape of the spar and the ring during spar deformation.

Referring now concurrently to FIGS. 9 and 10, as the tubular spar 28 deforms from the generally circular cross sectional shape shown by the full line at 28 into the ovoidal cross sectional shape shown by the broken 28a, the forward and aft sections 45, 47 of the ring 42 deflect horizontally a distance $D_1$, while the upper and lower sections 42c, 42d of the ring 42 deflect vertically a distance $D_2$, substantially matching the horizontal and vertical deflections of the tubular spar 28. As the ring 42 deforms along with the tubular spar 28, the ring 42 rotates 58 about the pivot pins 40 which correspond to the points of inflection 41. When the tubular spar 28 is re-pressurized with gas, the process described above is reversed. As the tubular spar 28 is refilled with gas, the increasing internal pressure in the tubular spar 28 causes the tubular spar 28 to deform back to a generally circular cross sectional shape.

Figure 11:
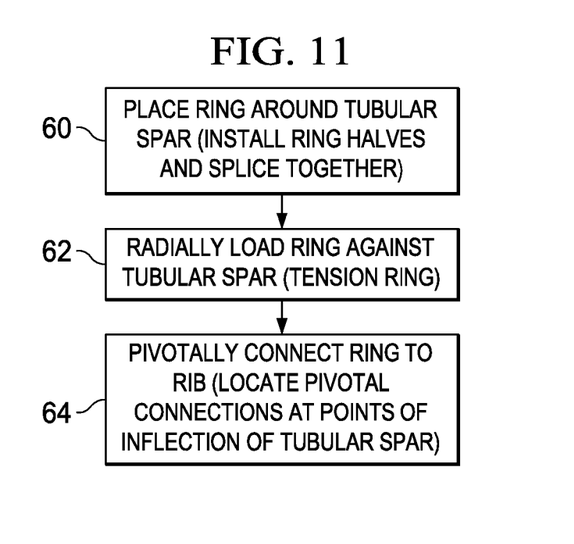
FIG. 11 is an illustration of a flow diagram of a method of attaching a rib to a tubular spar having a variable geometry.

Referring now to FIG. 11, a method of attaching a wing rib 30 to a tubular wing spar 28 begins at step 60 in which a ring 42 is placed around the tubular spar 28. As previously discussed, this installation process may comprise installing two ring halves 42a, 42b around the tubular spar 28 and then splicing the two ring halves 42a, 42b together. At step 62, the ring is radially loaded against the tubular spar 28. This loading step may be achieved by tensioning the ring 42 substantially concurrently during the ring installation process shown in step 60, or by tensioning the ring 42 after it has been installed around the tubular spar 28. At step 64, the ring 42 is pivotally connected to the rib 30. Step 64 may be performed by pivotally connecting the ring 42 with the tubular spar 28 by locating pivot pins at the points of inflection 41.

Figure 12:
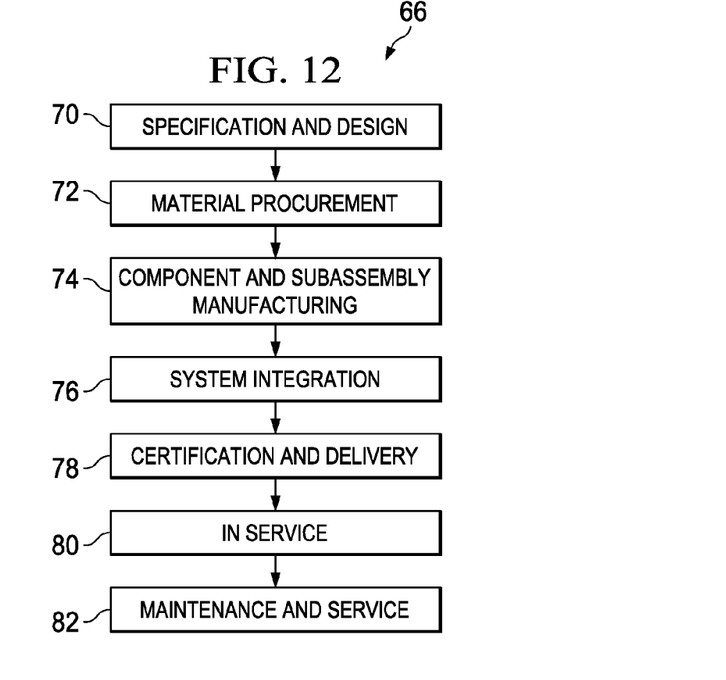
FIG. 12 is an illustration of a flow diagram of aircraft production and service methodology.
Figure 13:
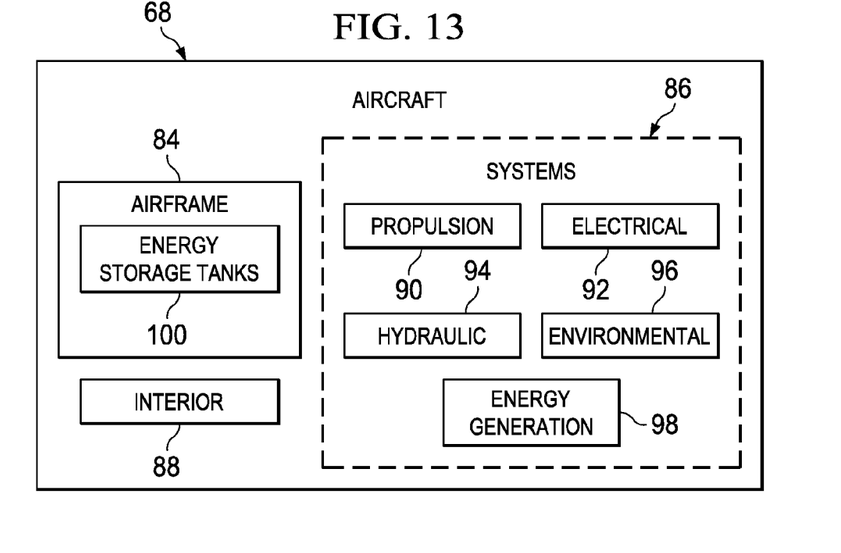
FIG. 13 is an illustration of a block diagram of an aircraft.

Embodiments of the disclosure may find use in a variety of potential applications, particularly in the transportation industry, including for example, aerospace, marine, automotive applications and other applications that employ deformable structures such as deformable tanks or deformable tubular members that are used to support non-deformable structures. Thus, referring now to FIGS. 12 and 13, embodiments of the disclosure may be used in the context of an aircraft manufacturing and service method 66 as shown in FIG. 12 and an aircraft 68 as shown in FIG. 13. During pre-production, exemplary method 66 may include specification and design 70 of the aircraft 68 and material procurement 72. During production, component and subassembly manufacturing 74 and system integration 76 of the aircraft 68 takes place. Thereafter, the aircraft 68 may go through certification and delivery 78 in order to be placed in service 80. While in service by a customer, the aircraft 68 is scheduled for routine maintenance and service 82, which may also include modification, reconfiguration, refurbishment, and so on.

Each of the processes of method 66 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13 the aircraft 68 produced by exemplary method 66 may include an airframe 84 with a plurality of systems 86 and an interior 88. Examples of high-level systems 86 include one or more of a propulsion system 90, an electrical system 92, a hydraulic system 94, an environmental system 96, an energy generation system 98 such as solar energy panels (not shown) and/or fuel cells (not shown). Energy produced by the energy generation system 98 may be stored in energy storage tanks 100 forming part of the airframe 84. For example, energy in gaseous or liquid form may be stored in the tubular spars 28 previously described. Any number of other systems may be included. Although an aerospace example is shown, certain of the principles of the disclosure may be applied to other industries.

Systems and methods embodied herein may be employed during any one or more of the stages of the production and service method 66. For example, components or subassemblies corresponding to production process 74 may be fabricated or manufactured in a manner similar to components or subassemblies produced while the aircraft is in service. Also, one or more apparatus embodiments, method embodiments, or a combination thereof may be utilized during the production stages 74 and 76, for example, by substantially expediting assembly of or reducing the cost of an aircraft 68. Similarly, one or more of apparatus embodiments, method embodiments, or a combination thereof may be utilized while the aircraft 68 is in service, for example and without limitation, to maintenance and service 82.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. For use in an aircraft wing, a joint for attaching a rib to a tubular spar, the tubular spar having a cross sectional shape that deforms during flight, the joint comprising:
   a ring substantially surrounding and attached to the tubular spar, wherein the ring extends around and engages substantially an entire circumference of the tubular spar; and
   pivot pins extending substantially parallel to the tubular spar, connecting the ring with the rib, and allowing relative movement between the rib and the tubular spar as a cross-sectional shape of the tubular spar deforms, wherein the rib includes upper and lower gaps into which the ring and the tubular spar deform.

2. The joint of claim 1, wherein the ring is compliant and is radially loaded against the tubular spar.

3. The joint of claim 1, wherein the ring has a radial stiffness that is less than a radial stiffness of the tubular spar.

4. The joint of claim 1, wherein:
   the rib includes a forward portion and a rear portion, and
   the pivot pins include a first pair of pivot pins pivotally connecting the ring with the forward portion of the rib, and a second pair of pivot pins pivotally connecting the ring with the rear portion of the rib.

5. The joint of claim 1, wherein the ring includes:
   first and second halves, and
   splice joints joining the first and second halves together.

6. The joint of claim 1, wherein:
   the cross sectional shape deforms about points of inflection along a curvature of the tubular spar where the curvature changes, and
   the pivot pins are respectively located substantially at the points of inflection.

7. The joint of claim 1, wherein the ring includes:
   first portions having a substantially U-shaped cross section, and
   second portions having a substantially flat cross sectional shape.

8. The joint of claim 1, wherein the ring is formed of a fiber reinforced polymer laminate.

9. A joint between a substantially non-deformable structure and a tubular member having a cross sectional shape that deforms about points of inflection along a curvature of the tubular member, comprising:
   a ring extending substantially around a circumference of and attached to the tubular member, wherein the ring extends around and engages substantially an entirety of the circumference of the tubular member; and
   pivot pins extending substantially parallel to the tubular member and connecting the ring with the non-deformable structure respectively at the points of inflection, wherein the tubular member includes upper and lower gaps into which the ring and the tubular member deform.

10. The joint of claim 9, wherein:
    the ring is compliant and is radially loaded against the tubular member substantially around the entirety of the circumference of the tubular member, and
    the ring is configured to remain compliant to the tubular member as the tubular member deforms.

11. The joint of claim 9, wherein the ring includes:
    a first portion having a substantially U-shaped cross section, and
    a second portion includes a substantially flat strap.

12. The joint of claim 9, further comprising:
    webs on the non-deformable structure, and
    wherein the pivot pins are respectively attached to the webs.

13. The joint of claim 9, wherein the ring is formed from a fiber reinforced polymer laminate.

14. The joint of claim 9, wherein:
    the ring is in tension and is loaded against the tubular member by the tension, and
    the ring is sufficiently compliant to change shape as the cross sectional shape of the tubular member deforms.

15. A method of attaching an aircraft wing rib to a tubular spar having a cross sectional shape that deforms during flight, comprising:
    placing a ring around the tubular spar, wherein the ring extends around and engages substantially an entire circumference of the tubular spar;
    loading the ring against the tubular spar; and
    pivotally connecting the ring to the rib, wherein pivotally connecting the ring to the rib includes locating pivotal pins in the rib and the tubular spar such that the pivotal pins extend substantially parallel to the tubular spar, and wherein the rib includes upper and lower gaps into which the ring and the tubular spar deform.

16. The method of claim 15, wherein loading of the ring against the tubular spar includes tensioning the ring.

17. The method of claim 15, wherein pivotally connecting the ring to the rib includes locating the pivotal pins between the rib and the tubular spar at points of inflection along a curvature of the tubular spar.

18. The method of claim 15, wherein placing the ring around the tubular spar includes:
    placing two ring halves around the tubular spar, and
    splicing the ring halves together.

19. The method of claim 15, further comprising:
    placing webs on the rib, and
    wherein pivotally connecting the ring to the rib is performed by pivotally connecting the ring to each of the webs.

* * * * *